United States Patent Office 3,291,248
Patented Dec. 13, 1966

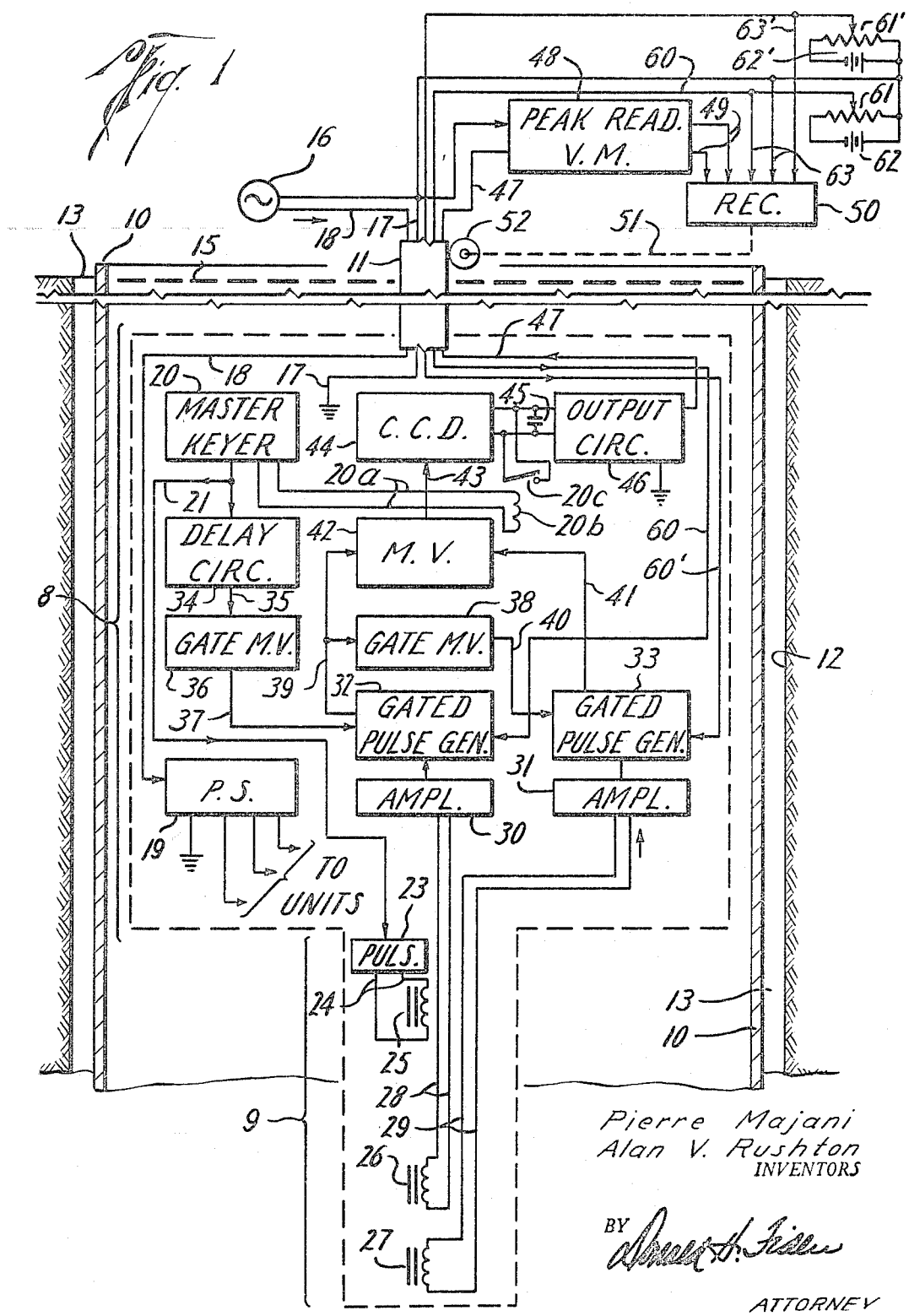

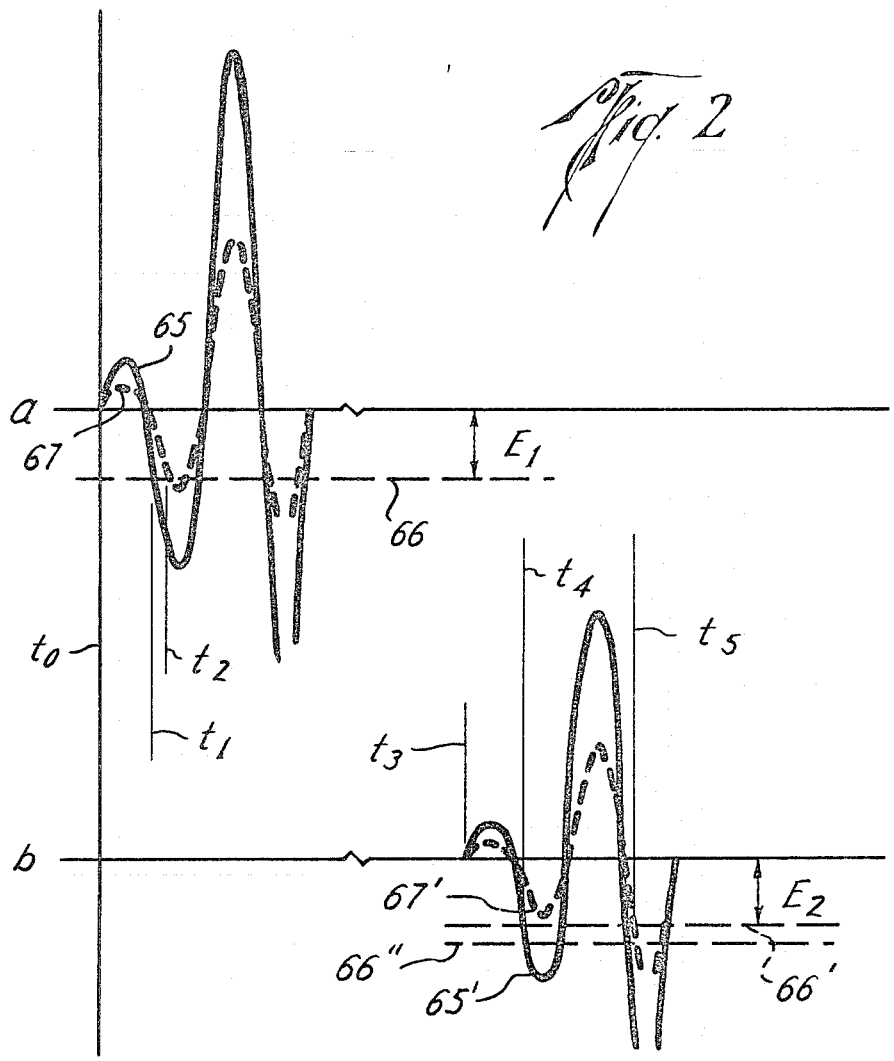

3,291,248
ACOUSTIC LOGGING SYSTEMS
Pierre Majani, Maracaibo, and Alan V. Rushton, Caracas, Venezuela, assignors, by mesne assignments, to Schlumberger Technology Corporation, Houston, Tex., a corporation of Texas
Continuation of application Ser. No. 4,809, Jan. 26, 1960. This application Mar. 30, 1960, Ser. No. 18,767
2 Claims. (Cl. 181—.5)

This application is a continuation of co-pending application Serial No. 4,809, filed January 26, 1960, for Acoustic Logging Systems, now abandoned.

The present invention relates to acoustic logging apparatus and, more particularly, to acoustic apparatus for investigating acoustic coupling of materials to a casing in a borehole.

In a typical well completion operation, a casing is positioned in the borehole and cement pumped into the annulus defined between the casing and borehole. For various reasons, the cement may fail to completely fill the annulus along the length of the casing, which often results in a condition generally known as "channeling." Moreover, part or portions of the column of cement may fail to bond to the casing or formations. In such instances, fluid from formations at other depths may migrate along the imperfections in the column of cement. Thus, if a production sand is completed as by perforation in a zone which includes such imperfections, migrating fluids and/or gases from other earth formations may impair the production of hydrocarbons from the sand.

In another typical instance, recovery operations for a "stuck" drill pipe, casing or the like wedged tight in a borehole by the earth formations often require a knowledge of the depth of the "stuck" point.

By means of the present invention, in the above instances, the acoustic coupling of material to the pipe string in the borehole, either cement bonding or the earth formations packing about the casing, is investigated to provide the desired information.

Accordingly, it is an object of the present invention to provide new and improved methods of determining locations behind a casing in a borehole at which materials are acoustically coupled to a casing.

An additional object of the present invention is to provide new and improved apparatus for determining by acoustic velocity techniques, the quality of a cement bond behind a casing.

In the systems embodying the present invention, to investigate the cement bonding of a casing in a borehole, acoustic energy is generated at a first location centrally of the casing and passed along the casing to a second location centrally of the casing where it is intercepted and translated into an electrical signal representative of the acoustic energy. Signal discrimination is employed with respect to the relative amplitude of a signal representing the acoustic energy passing along the casing wherein the casing or formation is not bonded to cement or stuck by other materials and the amplitude of a signal representing acoustic energy passing along the casing wherein the casing is bonded to cement or stuck by other materials. In this manner, a record of indications in develoved with respect to depth to provide indications where the cement does not bond to the casing. This discrimination is possible because signals representative of acoustic energy may be developed which typically consist of a series of alternations having a characteristic first cycle with a first peak of small amplitude and a given polarity relative to a reference value, followed by a second peak of considerably larger amplitude peak with an opposite polarity. The immediately following cycles of the electrical signal generally have peak amplitudes of opposed polarity which are relatively much larger than either the first or second peaks. Where the casing is "free," that is, the cement fails to bond or the spacing between the casing and borehole is open, the casing freely transmits the acoustic signal so that the amplitude of the second peak, for example, is predictable. On the other hand, if cement is bonded to the casing or, in instances when the formation is tightly packed about the casing, the acoustic energy passing through the casing is very greatly attenuated, so that the amplitude of the second peak is decidedly decreased. Hence, by developing indications of occasions where the second peak achieves a predicted value for free casing, it can be determined that cement has failed to bond to the casing and that it is free.

FIG. 1 illustrates a suitable apparatus for carrying out the method of the present invention; and FIGS. 2a, 2b are representations of certain signals useful in explaining the present invention.

In FIG. 1 of the drawings, an apparatus for performing the method of investigating the quality of cement bonding between a casing and a borehole as well as determining free casing is shown to comprise a borehole instrument including an upper, electronic section 8 and a lower transducer section 9 enclosed by appropriate pressure-tight housings capable of withstanding hydrostatic pressures encountered in a casing 10 where the unit is suspended by means of an armored, electric cable 11. Casing 10 is shown set in a borehole 12 and intermediate of the borehole 12 and casing 10 is an annulus 13 which may be cement. Should the cement fail to fill all of the annulus, earth formation spalling may pack about the casing or mud may be in the annulus. The casing 10 and borehole traverse the earth formations. By means of the cable 11 and a conventional winch (not shown), the borehole instrument may be passed through the casing 10 in order to obtain useful information concerning characteristics of free casing and the cement bonding to the casing 10. Casing 10 is filled with a fluid medium 15 which completes a sound transmission path between the transducer section 9 and the casing 10. The borehole instrument is centered in the casing 10 by means of conventional centralizers (not shown) to locate the transducer section along the central axis of the casing.

Eletrical energy from an alternating current generator 16 at the surface of the earth is supplied via conductors 17 and 18 of cable 11 and appropriate ground connections to a conventional power supply 19 within electronic section 8. The power supply 19 converts the applied alternating current to unidirectional potentials of appropriate magnitudes for operating the various circuit elements within electronic section 8 and in section 9.

A master keyer 20 which may be a conventional free-running multivibrator or a multivibrator synchronized with the frequency of source 16 supplies repetitive master keyer pulses at 100 millisecond intervals, for example, over a conductor 21 to a conventional pulser 23. In synchronism with each applied pulse, pulser 23 supplies a pulse of high current having a duration of, for example, one microsecond over leads 24 to a transmitting transducer 25 which may be of the magnetostriction type.

Preferably, both the pulser 23 and the transducer 25 are located in the upper end of transducer section 9.

To derive electrical signals in response to acoustic energy, a first receiving transducer 26 and a second receiving transducer 27 are positioned below the transmitter 25 in the recited order. The receivers 26 and 27 may be of the magnetostriction type and may be spaced from one another approximately three feet. The upper receiver 26 also may be spaced from the transmitter 25 a distance of three feet. These distances, however, may be set at any desired values. Alternatively, by using one or more additional receivers, multiple spacings may be employed on the same trip into a borehole.

The receivers 26 and 27 are coupled by leads 28 and 29 to respective pulse amplifiers 30 and 31 whose output circuits are coupled to individual gated pulse generators 32 and 33. These pulse generators are of conventional construction arranged so that no output signal is produced unless a control pulse is supplied to a control circuit.

To derive control pulses for generator 32, an extension of lead 21 from master keyer 20 is connected to the input circuit of a delay circuit 34 which provides a delay of approximately 140 microseconds. Delay circuit 34 is connected by a lead 35 to a conventional gate multivibrator 36 which generates a pulse of approximately 700 microseconds duration that is supplied via a lead 37 to the control circuit of pulse generator 32. A gate multivibrator 38 that is similar to gate multivibrator 36 has its input circuit connected by a lead 39 to the output circuit of pulse generator 32, and its output circuit is connected by a lead 40 to the control circuit of gated pulse generator 33. The purpose of this type of connection will be more apparent from the discussion to follow.

Output lead 39 of generator 32 and output lead 41 of generator 33 are connected to respective input circuits of a conventional multivibrator 42 which provides a pulse whose duration is dependent upon the time interval between the pulses applied to its input circuit. To derive an indication of travel time, the output circuit of multivibrator 42 is connected by a lead 43 to a constant current device 44 arranged to charge a condenser 45 in its output circuit in relation to the duration of each applied pulse. Master keyer 20 is connected by leads 20a to the operating coil 20b of a relay having normally open contact 20c connected across condenser 45. The signal at leads 20a is arranged to be in the form of a pulse which begins approximately 70 milliseconds after each master keyer pulse and of 30 milliseconds in duration. Accordingly, the condenser 45 is short circuited and is thus discharged and so remains during the 30 millisecond interval preceding each emitted pulse. At the condenser 45 there thus appears a pulse signal whose amplitude is dependent upon the duration of the pulse supplied by multivibrator 42. The condenser is connected to an output circircuit comprised of a conventional amplifier and cathode follower (not shown), in turn, connected by an insulated conductor 47 of cable 13 and appropriate ground connections to a conventional peak-reading voltmeter 48 at the surface of the earth. The voltmeter output is connected by leads 49 to a recorder 50 in which, through a conventional linkage 51 and a measuring wheel 52, the recording medium is transported in proportion to movement of cable 11.

In the performance of the method, in accordance with the present invention, gated pulse generators 32 and 33 are employed of the type that produce output pulses only in response to the application of input pulses or signals exceeding a given bias or voltage level. Adjustment of the bias level on these generators may be accomplished in a conventional manner; for example, a lead 60 extends from the surface control through cable 11 to the bias-control circuit (not shown) of generator 32. The bias voltage to generator 32 thus may be adjusted by means of a potentiometer 61 connected in parallel with a battery 62. In order to obtain a record of the voltage supplied to the control circuits of generator 32, the potentiometer 61 is connected by leads 63 to recorder 50. Similarly, a lead 60' extends from the surface through cable 11, to the bias-control circuit (not shown) of generator 33. The bias voltage to generator 33 thus may be adjusted by means of a potentiometer 61' connected in parallel with a battery 62'. In order to obtain a record of voltage supplied to the control circuits of generator 33, the potentiometer 61' is connected by leads 63' to recorder 50.

In operation, the units 8, 9 are lowered in the casing by means of cable 11 and, as it is subsequently raised, repetitive pulses are emitted from transmitting transducer 25 and propagated through the fluid medium 15 to the casing 10.

The pulse on lead 21 which operates pulser 23 thereby to generate a transmitted pulse is also supplied to delay circuit 34 and 140 microseconds later a pulse triggers multivibrator 36. The multivibrator 36 provides a negative-going pulse whose leading edge is synchronized with the pulse from delay circuit 34 and whose trailing edge occurs 700 microseconds later. This control pulse is supplied over lead 37 to condition pulse generator 32 for operation. Accordingly, when the signal representing a first arrival pulse of acoustic energy passing through the cassing is supplied by receiving transducer 26 to the amplifier 30, the amplified pulse causes generator 32 to generate an output pulse at lead 39. This pulse triggers multivibrator 38 and the resulting control pulse having its leading edge synchronized with the pulse from generator 32 and its trailing edge occurring 700 microseconds later, is applied over lead 40 to the control circuit of pulse generator 33. Generator 33 is thus operatively conditioned and when the signal representing acoustic energy incident upon receiving transducer 27 is translated by amplifier 31, generator 33 is triggered. The pulses from generators 32 and 33 are supplied to multivibrator 42 which generates a pulse having a duration representing the time spacing or interval Δt between the applied pulses. The latter pulse is supplied to constant current device 44.

Constant current device 44 causes the condenser 45 to charge linearly and this occurs for the duration of each pulse from the multivibrator 42. Accordingly, the condenser attains a charge voltage when is proportional to the duration of applied pulse. Thirty milliseconds before the next cycle of operation begins, the pulse at leads 20a energizes coil 20b thereby closing contact 20c and the condenser is discharged. These contacts open just prior to the next cycle of operation.

It is evident that the charge voltage on condenser 45 represents the time interval (Δt) between pulses received at transducers 26 and 27 and, of course, the reciprocal of this quantity represents acoustic velocity. Circuit resistance across the condenser is kept to a maximum so that the condenser remains at the particular charge voltage until it is short circuited by contacts 20c. The foregoing cycle is repeated with each master keyer pulse and voltage pulses are developed at condenser 45 of amplitudes representing travel time. These pulses are supplied via the output circuit 46 and cable conductor 47 to the peak-reading voltmeter 48 and the resulting voltage is supplied to the recorder 50. Thus, a log is derived representing the transit time (or acoustic velocity).

To facilitate an understanding of the present invention, it should be understood that when the cement 13 bonds to the casing, the pulse of energy from the pulser 23 transmitted through the casing is very greatly attenuated in amplitude. This results in an acoustic signal arriving at receiver 26 with a relatively low energy level or amplitude as contrasted to the energy level of the acoustic signal transmitted through a casing which does not have a cement bond. In either case, the acoustic energy which arrives at the second receiver 27 is even further attenuated relative to the energy which arrives at the first receiver 26.

Referring now to FIG. 2, the signal conditions are illustrated by waveforms (not to scale) which further illustrate concepts of the present invention. As shown in FIG. 2a, a relatively large acoustical signal arriving at receiver 26 produces a large electrical signal when the casing is "free" or imperfectly cement bonded, the electrical signal being represented by a solid line curve 65 originating at a time $t_0$. The energy represented by amplitude of the first negative swing of the signal 65 is greater than or exceeds a given bias level 66 set at a voltage value of $E_1$. The bias level 66 is represented by a magnitude $E_1$ on the lower or negative portion of the amplitude scale for convenience of explanation although the bias actually may have a positive polarity. Thus, the amplitude of the casing signal, when the casing is imperfectly bonded to the earth formations, exceeds the bias level 66 and triggers the pulse generator 32 at a time $t_1$.

As shown in FIG. 2b, the same casing signal 65 arrives at receiver 27 at a subsequent time $t_3$ as shown by waveform 65' and is somewhat attenuated; however, the amplitude of the first negative swing of the signal exceeds the bias level 66' so that generator 33 produces a pulse to actuate multivibrator 42 at a time $t_4$. The multivibrator 42 and constant current device 44 being turned "on" at $t_1$ and "off" at $t_4$ thereby produces an indication of the time interval $\Delta t$ between the signals 65, 65' respectively developed by the receivers 26 and 27 by developing a voltage pulse on condenser 45 in the manner described heretofore. The $\Delta t$ measurement for a steel casing with a span of three feet between receivers would, for example, be 171 microseconds or, on a per foot basis, 57 microseconds.

The $\Delta t$ measurement is then applied to a record in the recorder 50, which is correlated with the depth at which the measurement was taken. For an interval of casing passed by the apparatus, the various $\Delta t$ measurements would be constant so long as the casing remained "free" of cement or formations. However, the casing collars coupling the sections of casing to one another provide an anomaly in the string of casing which is readily detectable due to changes in attenuation of the acoustic signal so the casing collars are indicated at regular intervals by slight $\Delta t$ measurement changes.

In an interval of the casing along which cement is bonded to the casing, the acoustic signal would be attenuated to a greater extent. Thus, a signal 67 (FIG. 2a) would be developed by receiver 26. It will be noted that the bias level 66 is adjusted so that the first negative swing of either signal 65 or 67 will trigger the generator 32. Hence, signal 67 will trigger the generator at a time $t_2$ which is substantially the same as time $t_1$. However, when the acoustic energy arrives at the second receiver, the signal 67' is attenuated so that the first negative peak fails to achieve the bias voltage level 66' so that the generator 33 is not triggered until the second negative peak exceeds level 66' at a time $t_5$. Thus, the time interval between the detecting times at $t_2$ and $t_5$ will be greater than the time interval between the detecting times $t_1$ and $t_4$ by one cycle of the signal. With a transmitter frequency of 30 kc., for example, the period would be 33 microseconds per foot. Hence, on the recording for a three foot spacing between receivers, an indication of 270 microseconds (171+99) indicates the presence and bonding of cement to the casing.

From the foregoing, it will be appreciated that as the apparatus is passed along the casing, a record is developed which includes a base line indicating the velocity of acoustic energy where the casing is free of bonding together with excursions to one side of the base line based on a definite time period at intervals along the casing where bonding of cement or packing of formations to the casing occurs.

In performance of the method, the bias voltage is set to a level where the $\Delta t$ measurement obtained is representative of the time interval normally obtained for the passage of acoustic energy through casing. To set the bias level, the apparatus is lowered to a location where the casing is known to be free. Thereafter, the apparatus is relocated at a location where the casing is known to have cement bonded thereto. Then, the bias level is readjusted to obtain a $\Delta t$ measurement which is a function of the above-mentioned time interval for passage of acoustic energy through the casing plus a time interval representative of one or more additional alternations of the acoustic energy. The setting of the bias level may be done with the apparatus in the various positions along the casing, as above described, or may be a predetermined value determined from experience. In any event, the level is a value which is slightly less than the expected amplitude of an attenuated signal at the receiver nearest the transmitter and greater than the expected amplitude of the attenuated signal at the receiver farthest from the transmitter when the receivers are opposite cement bonded casing. Also, it should be noted that centralizing of the apparatus in the casing is necessary to insure the uniformity of casing signals as well as their maximum intensity.

The magnitude $E_2$ of the bias level 66' may be adjusted to be equal to the magnitude $E_1$ by appropriate adjustments of potentiometers 61, 61'. However, by the independent adjustment of bias level 66', the magnitude $E_2$ may be increased, for example, to the level 66" which still allows detection of free casing but increases the reliability for detection of stuck or bonded casing in that a larger amplitude of signal is required to actuate the pulse generator.

A cement top may be easily located by the use of the present invention by observing the transition of the $\Delta t$ from a greatly attenuated acoustic signal obtained in stuck or bonded casing to a normal $\Delta t$ indication for a free casing. The transition occurs when the cement top is reached and the acoustic energy is no longer attenuated. Thus, the energy is confined to the casing since no cement bonding is present to attenuate the casing signal and the $\Delta t$ indication is constant.

While only one apparatus is herein described, another apparatus for performing the method is disclosed in the co-pending application of Lee H. Gollwitzer, Serial No. 831,328, filed August 3, 1959.

While particular embodiments of the present invention have been described, it is apparent that changes and modifications thereof may be made without departing from the invention in its broader aspects, and therefore, the aim in the appended claims is to cover all such changes and modifications as fall within the true spirit and scope of the invention.

What is claimed is:

1. The method of investigating the quality of the bonding of an annulus of cement to a metallic casing which has been cemented in a borehole comprising the steps of: probing intervals of the casing with acoustic energy traveling between spaced locations; setting the energy level at which acoustic energy is detected to obtain sensible indications of the travel time of acoustic energy through the casing between the spaced locations at an interval along the bore where the casing is not bonded to the cement; re-setting the energy level at which acoustic energy is detected to obtain sensible indications of the travel time of acoustic energy through the casing between spaced locations at an interval along the bore where the casing is bonded to the cement; and thereafter finally setting the energy level at which acoustic energy is detected to obtain sensible indications differentiating between the travel time of acoustic energy between said spaced locations through a cement bonded casing and a casing which is not bonded to the cement.

2. The method of locating zones of bonding between well pipe and surrounding material with the aid of acoustic energy transmitted along the well pipe, the acoustic energy attenuation characteristic of the well pipe being dependent upon the quality of the bond to the surrounding material, the better the bond the greater the attenuation, comprising the steps of generating pulses of acoustic energy at intervals along a well pipe substantially along the axis thereof and transmitting at least a part of said energy along said well pipe, detecting the arrival of such acoustic pulses at a pair of spaced points spaced substantially a fixed distance along said axis from the points of generation to develop a corresponding pair of electrical signals, detecting only excursions of said electrical signals which occur at times following generation of a pulse representative of the travel times of acoustic energy along the pipe, deriving from said excursions further electrical signals indicative of the attenuation of said acoustic energy provided by said well pipe, and recording said further electrical signals as a function of position along the pipe to provide an indication of the quality of the bond between the pipe and the surrounding material.

References Cited by the Examiner

UNITED STATES PATENTS

| | | | |
|---|---|---|---|
| 2,857,011 | 10/1958 | Summers | 181—.5 |
| 2,938,592 | 5/1960 | Charske et al. | 181—.5 |
| 3,050,150 | 8/1962 | Tixier | 340—15.5 X |
| 3,174,577 | 3/1965 | Holley | 340—18 X |

BENJAMIN A. BORCHELT, *Primary Examiner.*

CHARLES W. ROBINSON, CHESTER L. JUSTUS, SAMUEL FEINBERG, *Examiners.*

R. J. BAYNHAM, A. E. HALL, J. W. MILLS, R. M. SKOLNIK, *Assistant Examiners.*